US006931304B1

(12) United States Patent
Miller et al.

(10) Patent No.: US 6,931,304 B1
(45) Date of Patent: Aug. 16, 2005

(54) SCALABLE MEANS OF SUPPLYING POWER TO A REMOTELY CONTROLLED, SEMI-AUTONOMOUS ROBOT

(75) Inventors: David W. Miller, Lafayette, CO (US); Frank T. Smith, Nederland, CO (US); Timothy C. Ostwald, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/535,842

(22) Filed: Mar. 28, 2000

(51) Int. Cl.[7] .......................... G06F 19/00; G06F 7/00
(52) U.S. Cl. .................. 700/245; 700/214; 369/30.34
(58) Field of Search ............................. 700/214, 245; 310/12

(56) References Cited

U.S. PATENT DOCUMENTS

| | | | |
|---|---|---|---|
| 3,914,562 A | 10/1975 | Bolger | 191/10 |
| 4,061,089 A | 12/1977 | Sawyer | 104/23.2 |
| 4,092,554 A | 5/1978 | Quinn | 104/292 |
| 4,286,180 A * | 8/1981 | Langley | 310/12 |
| 4,331,225 A | 5/1982 | Bolger | 191/10 |
| 4,335,338 A * | 6/1982 | Sawyer | 318/135 |
| 4,635,328 A * | 1/1987 | Palmer | 29/26 A |
| 4,836,344 A | 6/1989 | Bolger | 191/10 |
| 4,924,171 A | 5/1990 | Baba et al. | 323/347 |
| 4,942,352 A | 7/1990 | Sano | 320/134 |
| 5,207,304 A | 5/1993 | Lechner et al. | 191/10 |
| 5,293,308 A | 3/1994 | Boys et al. | 363/37 |
| 5,395,199 A | 3/1995 | Day, III et al. | 414/267 |
| 5,422,519 A | 6/1995 | Russell | 307/104 |
| 5,467,718 A | 11/1995 | Shibata et al. | 106/287.24 |
| 5,486,727 A * | 1/1996 | Heidelberg et al. | 310/12 |
| 5,528,113 A | 6/1996 | Boys et al. | 318/16 |
| 5,589,859 A * | 12/1996 | Schantz | 347/19 |
| 5,646,917 A * | 7/1997 | Miyoshi et al. | 369/30.34 |
| 5,821,638 A | 10/1998 | Boys et al. | 307/104 |
| 5,831,841 A | 11/1998 | Nishino | 363/37 |
| 5,855,261 A | 1/1999 | Odachi et al. | 191/10 |
| 6,116,707 A * | 9/2000 | Avida | 346/139 R |
| 6,421,600 B1 * | 7/2002 | Ross | 701/117 |

FOREIGN PATENT DOCUMENTS

| | | |
|---|---|---|
| DE | 42 36 340 A1 | 5/1994 |
| EP | 42 36 340 | 5/1994 |

OTHER PUBLICATIONS

Albert Esser and Hans-Christoph Skudelny, A New Approach to Power Supplies for Robots, IEEE Transactions on Industry Applications, vol. 27. No. 5, Sep./Oct. 1991, pp. 872-875.

* cited by examiner

*Primary Examiner*—Leo Picard
*Assistant Examiner*—Sheela S. Rao
(74) *Attorney, Agent, or Firm*—Brooks Kushman P.C.

(57) ABSTRACT

An automated library system having multiple storage cells for storing multiple data cartridges. Rails are provided adjacent to the storage cells to guide one or more robots among the storage cells. Primary coils are disposed proximate the rails. A power supply produces an alternating current in the primary coils. One or more magnetic cores are mounted on each robot. Each magnetic core is adjustable to form a normally gap-less closed magnetic path, and a gapped magnetic path when transitioning between primary coils. Alternating currents in the primary coils induce secondary alternating currents in secondary coils wound around the magnetic cores. The secondary alternating currents are controlled and converted into mechanical movement that include loading and unloading the data cartridges to and from the robots, and moving the data cartridges along the rails.

21 Claims, 9 Drawing Sheets

Fig. 14

SCALABLE MEANS OF SUPPLYING POWER TO A REMOTELY CONTROLLED, SEMI-AUTONOMOUS ROBOT

TECHNICAL FIELD

The present invention relates to the field of power distribution and power management within an automated library system, and power distribution to robots within the automated library system.

BACKGROUND ART

Early automated library systems consisted of a handful of storage cells, a simple robot, and one or two media drives. Each storage cell held one data cartridge. Each media drive accommodated one data cartridge at a time. The robot's function was to manipulate the data cartridges one at a time, moving them between the various storage cells and the media drives. One common automated library system design arranged the storage cells and media drives in a two-dimensional array. The robot for this arrangement was movable along straight lines in X and Y directions across the face of the array. Another common design arranged the storage cells and media drives in a cylindrical pattern. Here, the robot was moveable along and around the cylinder's axis.

Complexity and performance of the robots increased as the number of data cartridges and media drives within the robotic storage libraries increased. Eventually though, the robot's performance became a limiting factor in the overall performance of the automated library system. One robot could only mount or dismount one data cartridge at a time from one media drive. This limitation was overcome by connecting multiple copies of the automated library systems together with interlibrary transfer mechanisms. Now, multiple robots could operate simultaneously to service multiple media drives simultaneously.

Continued increases in the number of data cartridges and media drives revealed that the interlibrary transfer mechanisms were the next limiting factor. Interlibrary transfers required the attention of the robots in both the sending library and the receiving library. While the robots were busy transferring a data cartridge, they could not service the media drives.

The latest generation of automated library systems use multiple rail guided robots. Each rail guided robot is free to move among all of the storage cells and media drives simultaneously. This allows multiple media drives to be serviced simultaneously. Another advantage is that the rails may be routed between adjacent libraries effectively merging all of the libraries into one large library system. Dedicated interlibrary transfer mechanisms and their associated limitations are unnecessary.

Rail guided robots raise issues concerning power distribution. Power was easily provided to the earlier robots. Slip rings transferred power to robots mounted on a fixed axis of rotation. Flexible wiring harnesses carried power to robots that moved back and forth along straight paths. In contrast, rail guided robots have no fixed mounting location and can move along complex paths. Slip rings do not work with rail-based systems, and flexible wiring harnesses can become entangled as two or more rail guided robots cross each other's paths. Rail guided robots must receive power through a fixed distribution medium and/or have an onboard power source.

Power distribution through rails is commonly used in railroad technologies. Large railroad locomotives receive three-phase electrical power through collector shoes engaging power rails paralleling the train tracks. Model railroads use a similar type approach by distributing single-phase or direct current electrical power through the train tracks themselves to conductive wheels on the railroad locomotives.

Both railroad power distribution methods are potential particulate contamination generators due to wear on the contacting surfaces. Intermittent bouncing between the contacting surfaces may also generate considerable electromagnetic noise. Neither of these situations is desired in the automated library environment. Particulate contamination can interfere with information transfers between the data cartridges and media drives. Electromagnetic noise can corrupt the information.

Onboard power sources for autonomous robots within an automated library system are disclosed in U.S. Pat. No. 5,395,199 issued to Day, III et al. on Mar. 7, 1995. Day's robots are powered by onboard batteries. Batteries do not generate particulate contaminants, nor do they generate electromagnetic noise. However, batteries require occasional recharging making the robot unavailable for extended periods.

Rail guided robots also raise issues concerning power scaling. Power scaling for rail guided robots with onboard batteries require scaling of the number of installed battery chargers. Additional battery chargers must be added to the automated library system as additional rail guided robots are added to keep all of the batteries charged. Attention must also be given to the layout of the rails so that each rail guided robot can reach one of the battery chargers when its onboard battery runs low.

Rail transmitted power scaling requires tradeoffs between the maximum current capacity of each rail and the number of independent power zones within the automated library system. Rail size can be kept reasonable by limiting the maximum wattage or number of rail guided robots that can draw power from any one rail at any given time. This usually requires large automated library systems to be divided into multiple power zones.

Rail guided robots moving between adjacent power zones and switching between adjoining rails may be required to accommodate potential differences in the electrical power in each power zone and possibly a powerless region. In a make-before-break type transition, the rail guided robots must be able to connect to two adjacent power zones simultaneously without severe interactions. In a break-before-make type transition, the rail guided robots must have some minimal onboard power source to sustain themselves while they are out of contact with all power zones.

DISCLOSURE OF INVENTION

The present invention is an automated library system, a robot for use in the automated library system, and a method of operating the automated library system wherein electrical power is inductively coupled to the robot(s) from one or more primary coils. The automated library system has multiple storage cells for storing multiple data cartridges. One or more rails are provided adjacent to the storage cells to guide one or more robots between the storage cells and media drives, if any. Each robot is capable of inserting and removing at least one data cartridge at a time to and from the storage cells. One or more primary coils are disposed proximate the rails. A power supply produces an alternating current in the primary coils. One or more magnetic cores, each having a secondary coil, are mounted on each robot and intersect one of the primary coils. Each magnetic core inductively couples at least a portion of the alternating current in the intersected primary coil into a secondary alternating current in its secondary coil. The secondary alternating currents are used to power the robots.

Each robot is organized around a frame. A drive mechanism couples the frame to the rails and moves the robot along the rails. The magnetic core is mounted on the frame. Electrical power in the secondary coils wound around the magnetic core is coupled to an electronic circuit mounted on the frame. An optional gripper mechanism and an optional bar-code reader may also be mounted on the frame and receive electrical power from the electronics circuit.

Each magnetic core comprises two core members. When the robot is installed on a primary coil, the two core members form a closed magnetic path that intersects the primary coil and the associated secondary coil. This closed magnetic path provides good inductive coupling between the primary coil and the secondary coil. The two core members are moveable with respect to each other to allow the magnetic core to be installed and removed from the primary coils. Gravity or a resilient member is used to bias the two core members together. Installation and removal of the magnetic core from the primary coils include the robot transitioning between adjacent primary coils.

Two embodiments are disclosed that allow the robots to transition between adjacent primary coils without a loss of power. In one embodiment, a second magnetic core having a secondary coil is mounted on each robot. The two magnetic cores are spaced apart from each other to bridge any powerless region that may exist between adjacent primary coils. As the robot transitions between primary coils, the leading magnetic core inductively couples electrical power from the next primary coil before the trailing magnetic core becomes unable to draw electrical power from the present primary coil. In another embodiment, an onboard battery is mounted on each robot to provide electrical power while the magnetic core is in the powerless region between adjacent primary coils.

A switching unit may be connected between the power supply and primary coils in automated library systems having multiple primary coils. The switching unit switches on the alternating current to individual primary coils proximate one or more robots. When no robots are near a particular primary coil, the switching unit switches off the alternating current to that particular primary coil. Sensors may be used to inform the switching unit when robots are near or far from the individual primary coils. Alternatively, a controller that directs the movement of the robots may inform the switching unit where power is and is not required.

Accordingly, it is an object of the present invention to provide an automated library system that provides electrical power to its robots by inductive coupling.

Another object of the present invention is to provide a robot for use in an automated library system wherein the robot is inductively coupled to a primary coil through a magnetic core that normally forms a closed magnetic path.

Yet another object of the present invention is to provide a method of operating the automated library system to convert an alternating current in a primary coil into mechanical movement in the robot to manipulate the data cartridges stored within the automated library system.

These and other objects, features and advantages will be readily apparent upon consideration of the following detailed description in conjunction with the accompanying drawings.

BEST MODE FOR CARRYING OUT THE INVENTION

Figure 1:
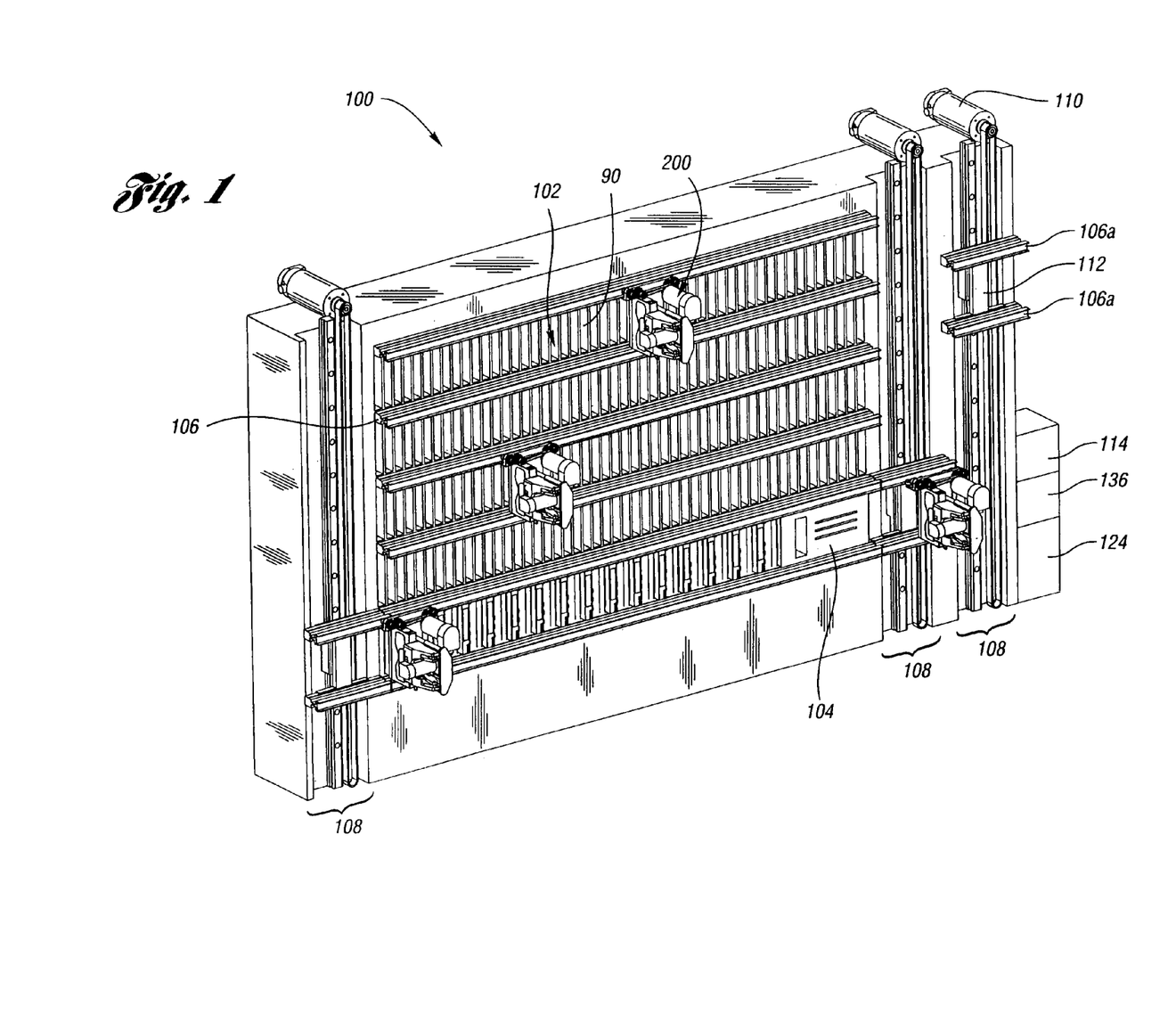
FIG. 1 is a perspective view of an automated library system implementing the present invention.

A typical wall-type automated library system 100 is shown in FIG. 1. This automated library system 100 has multiple storage cells 102 for storing data cartridges 90. The data cartridges 90 are moved among the storage cells 102 and a media drive 104 by one or more robots 200. Robots 200 move horizontally along rails 106 to access rows of storage cells 102. Elevators 108 are provided beyond the storage cells 102 to move the robots 200 vertically. Each elevator 108 has an elevator motor 110 that moves a carriage 112. Each carriage 112 has two small sections of rail 106a to support one robot 200 at a time.

A controller 114 provides commands to the robots 200 and elevators 108 to manipulate the data cartridges 90. The controller 114 communicates with each robot 200 individually by radio frequency communication links, infrared communication links, or other wireless links. Wired communication links may be used if only one, or a few robots 200 are used in the automated library system 100 and their paths are sufficiently simple to keep the wires from becoming entangled with each other. Commands to the robots 200 include, but are not limited to, movement along the rails 106, movement of the data cartridges 90 into and out of the robots 200, and reading bar-codes on the data cartridges 90.

Communications between the controller 114 and elevator motors 110 are typically provided by direct wiring. Commands from the controller 114 to each elevator motor 110 include at least moving the carriages 112 up, moving the carriages 112 down, and holding the carriages 112 in position. Each elevator motor 110 is controlled independently of the other elevator motors 110.

The controller 114 may also be in communication with the media drive 104. In one embodiment, commands to mount and dismount data cartridges 90 are routed through the controller 114. Controller 114 coordinates these commands with positioning commands to a robot 200 that provides or receives the data cartridge 90 to and from the media drive 104. In another embodiment, the mount and dismount commands are provided directly to the media drive 104 from an external source (not shown). Here, the controller 114 coordinates with the external source to position the proper robot 200 before the media drive 104 prior to the mount or dismount command being given to the media drive 104.

Figure 2:
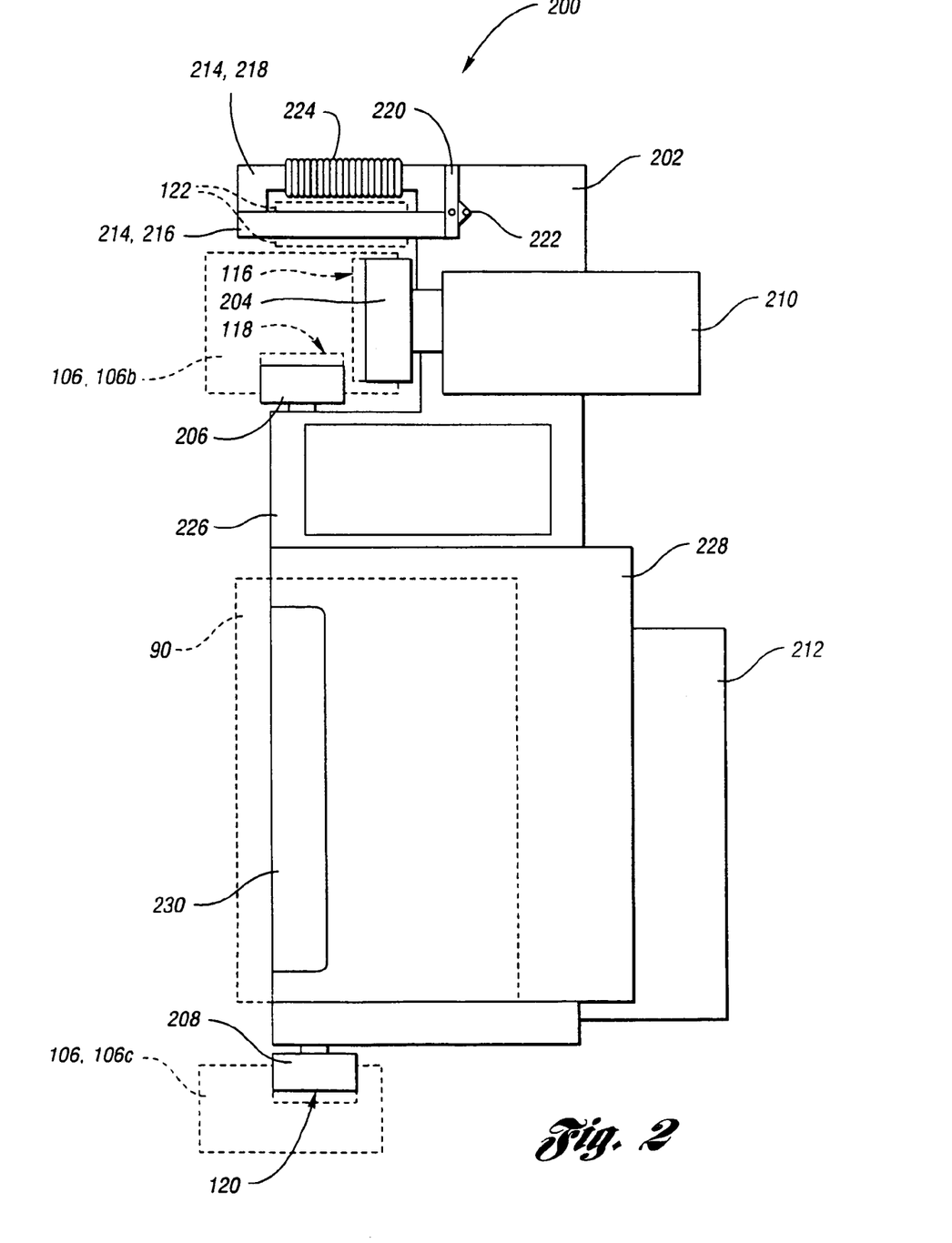
FIG. 2 is a side view of a robot implementing the present invention.

FIG. 2 is a side view of a robot 200 supported on an upper rail 106b and a lower rail 106c (both shown in phantom). Robot 200 has a frame 202 for structural support. Frame 202 is suspended from the upper rail 106b by multiple main drive wheels 204 that ride in a main groove 116 provided in the upper rail 106b. Additional wheels 206 and 208 are rotatably mounted on the frame 202. These additional wheels 206 and 208 move in additional grooves 118 and 120 provided in the upper rail 106b and lower rail 106c respectively. The additional wheels 206 and 208 help orient the robot 200 with respect to the storage cells 102 and media drive 104.

Main drive wheels 204 are coupled to a drive mechanism 210. Drive mechanism 210 rotates the main drive wheels 204 to cause the robot 200 to move along the rails 106. An electronics circuit 212 coupled to the drive mechanism 210 provides control over the speed and direction of the main drive wheels 204. The electronics circuit 212 also provides the communication link to the controller 114.

A magnetic core 214 is also mounted on the frame 202. The magnetic core 214 is positioned to intersect a primary coil 122 (shown in phantom) when the robot 200 is supported on the rails 106. The primary coil 122 itself is mounted at a fixed distance adjacent to the rails 106. The magnetic core 214 is made in two halves, a first core member 216 that is attached to the frame 202, and a second core member 218 moveably connected to the first core member 216. This relative movement between the two core members 216 and 218 allow the magnetic core 214 to be installed and removed from the primary coils 122.

A hinge 220 couples the first core member 216 to the second core member 218 while providing for relative movement between them. In the orientation shown in FIG. 2, gravity normally biases the second core member 218 toward the first core member 216. In the preferred embodiment, a resilient member 222, such as a spring or the like, is mounted between the first core member 216 and the second core member 218. The resilient member 222 is mounted to bias the first and second core members 216 and 218 together, regardless of the orientation of the magnetic core 214 with respect to gravity.

A secondary coil 224 is wound around the magnetic core 214. The magnetic core 214 inductively couples the secondary coil 224 to the primary coils 122. An alternating current flowing in the primary coils 122 induces an alternating magnetic flux in the magnetic core 214. The alternating magnetic flux flowing through the magnetic core 214 induces a secondary alternating current in the secondary coil 224. The secondary alternating current is routed to the electronics circuit 212 where it is rectified to provide direct current electrical power throughout the robot 200. Referring back to FIG. 1 momentarily, the alternating current flowing in the primary coils 122 is generated by a power supply 124.

In one embodiment, a battery 226 may be included on the robot 200 to provide temporary electrical power when there is insufficient or no power available through the secondary coil 224 for any reason. Battery 226 also provides for a smooth time-average power draw from the primary coil 122. The battery 226 is mounted to the frame 202 and is sized to provide sufficient electrical current to keep the drive mechanism 210 rotating for at least several seconds. This capability, as will be shown later, allows the robot 200 to disconnect from one primary coil 122, traverse a powerless region, and then inductively connect to an adjacent primary coil 122 without ever losing electrical power. The non-loss of electrical power is important in maintaining communications with the controller 114, maintaining control of any storage cartridge 90 being carried by the robot 200, and maintaining any volatile memory devices used within the robot 200, such as in the electronics circuit 212. The battery 226 also provides supplemental electrical power to handle peak demands onboard the robot 200, for example as the robot 200 transitions from stationary to moving along the rail 106.

Two other items that may be included in the robot 200 are a gripper mechanism 228 and a bar-code reader 229. Most robots 200 will include at least the gripper mechanism 228. A few of the robots 200 may also carry the bar-code reader 229 in addition to the gripper mechanism 228. In very large automated library systems 100, it may be desirable to include several robots 200 that only carry the bar-code reader 229 and not a gripper mechanism 228. Here, the bar-code reader 229 only robots 200 roam throughout the automated library system 100 providing constant updates of the actual data cartridges 90 found and their storage cell 102 locations.

Figure 3:
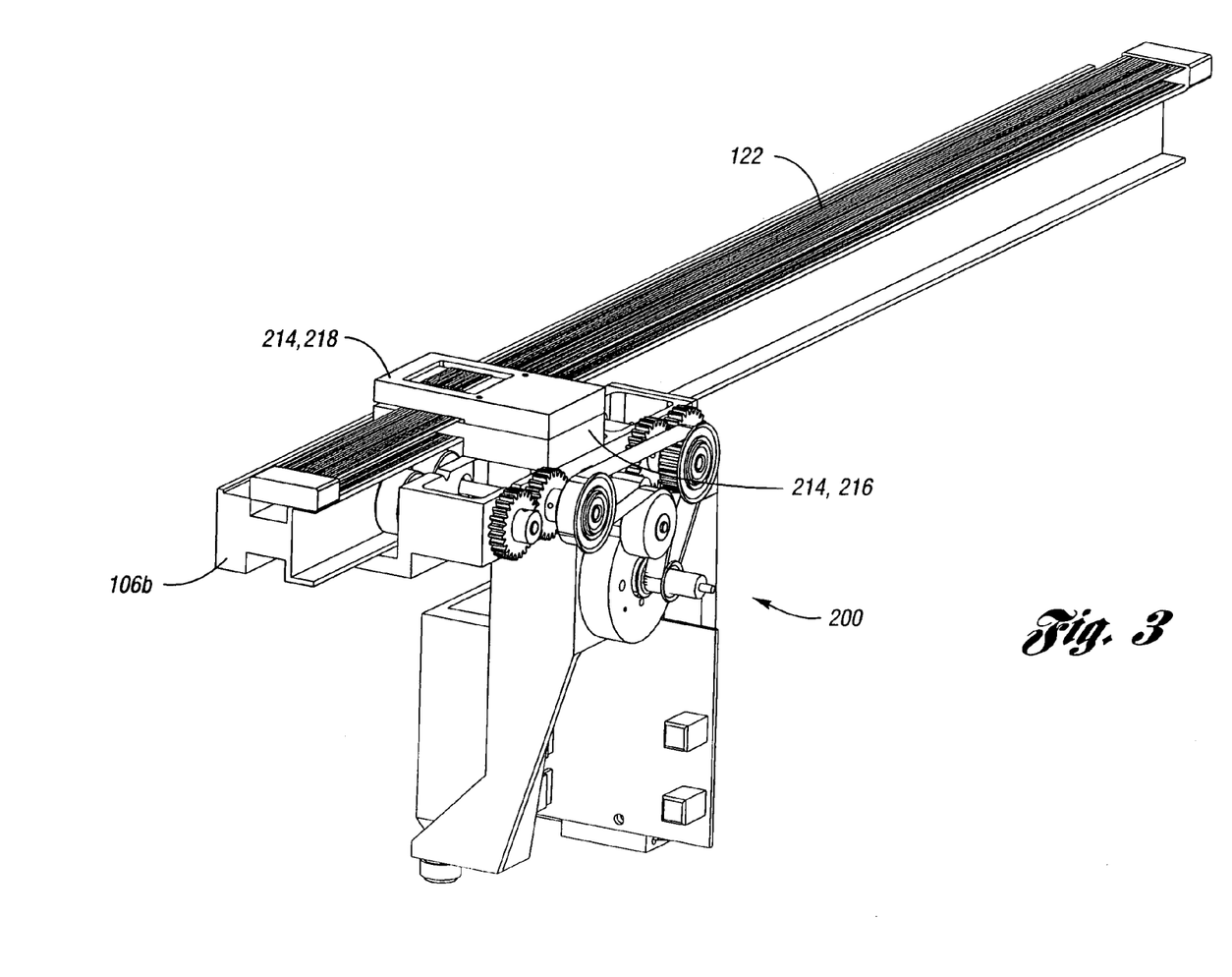
FIG. 3 is a perspective view of the robot, a rail and a primary coil.

FIG. 3 is a perspective view of the robot 200 mounted on upper rail 106b. This view shows the preferred embodiment of the primary coil 122. Here, the primary coil 122 has a rectangular winding arrangement that is adjacent to two sides of the first core member 216 and passes between the first core member 216 and second core member 218. This arrangement provides a strong inductive coupling between the primary coil 122 and the magnetic core 214. As will be shown later, other arrangements of the primary coil 122 are possible within the scope of the present invention.

Figure 4:
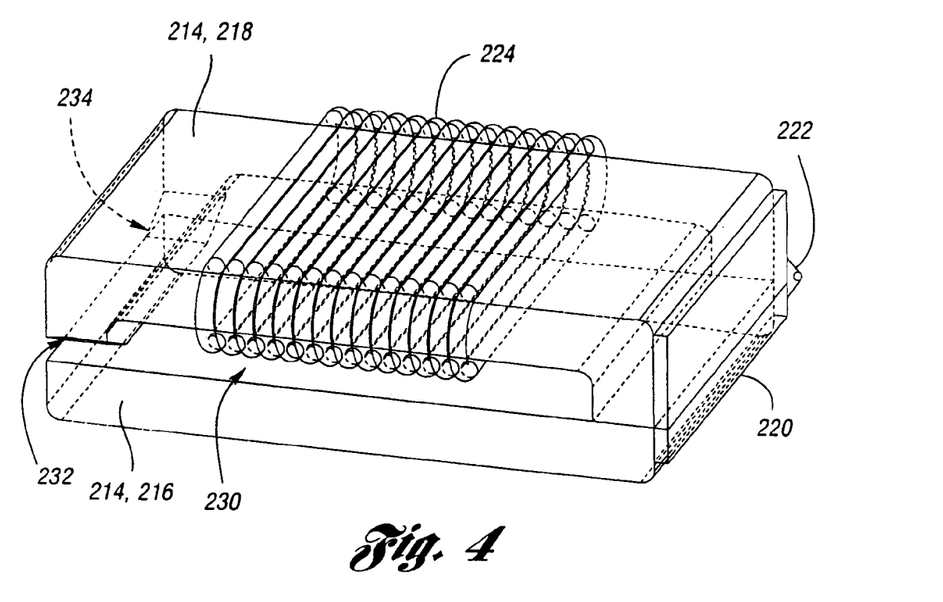
FIG. 4 is a wire frame view of a magnetic core in a closed position.

FIG. 4 is a wire-frame model of the magnetic core 214 with the secondary coil 224 wrapped around the second core member 218. When biased together by the resilient member 222, the first core member 216 and second core member 218 physically touch each other in two locations to form a closed magnetic path around an aperture 230. The second core member 218 has beveled edges 232 in one location where the second core member 218 engages the first core member 216 (the location away from the hinge 220). These beveled edges 232 aid in the insertion and removal of the primary coil 122 into and out of the aperture 230 respectively.

In the preferred embodiment, the secondary coil 224 is wound around the second core member 218. The secondary coil 224 may also be wound around the first core member 216 only, or around both the first core member 216 and the second core member 218.

Figure 5:
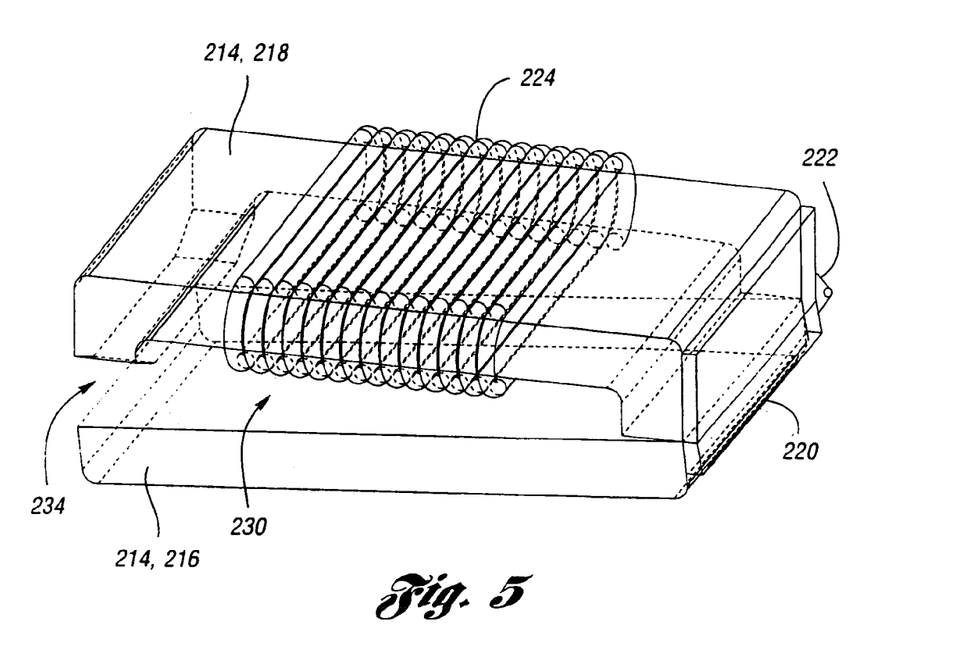
FIG. 5 is a wire frame view of the magnetic core in an open position.

FIG. 5 shows the magnetic core 214 with the second core member 218 partially displaced from the first core member 216 creating a gap 234. In this position, the magnetic core 214 can still inductively couple the secondary coil 224 to the primary coil 122 (not shown in this figure). Gap 234 does, however, weaken the magnetic flux present in the magnetic core 214 and thus reduces the secondary alternating current induced in the secondary coil 224.

Figures 6, 7:
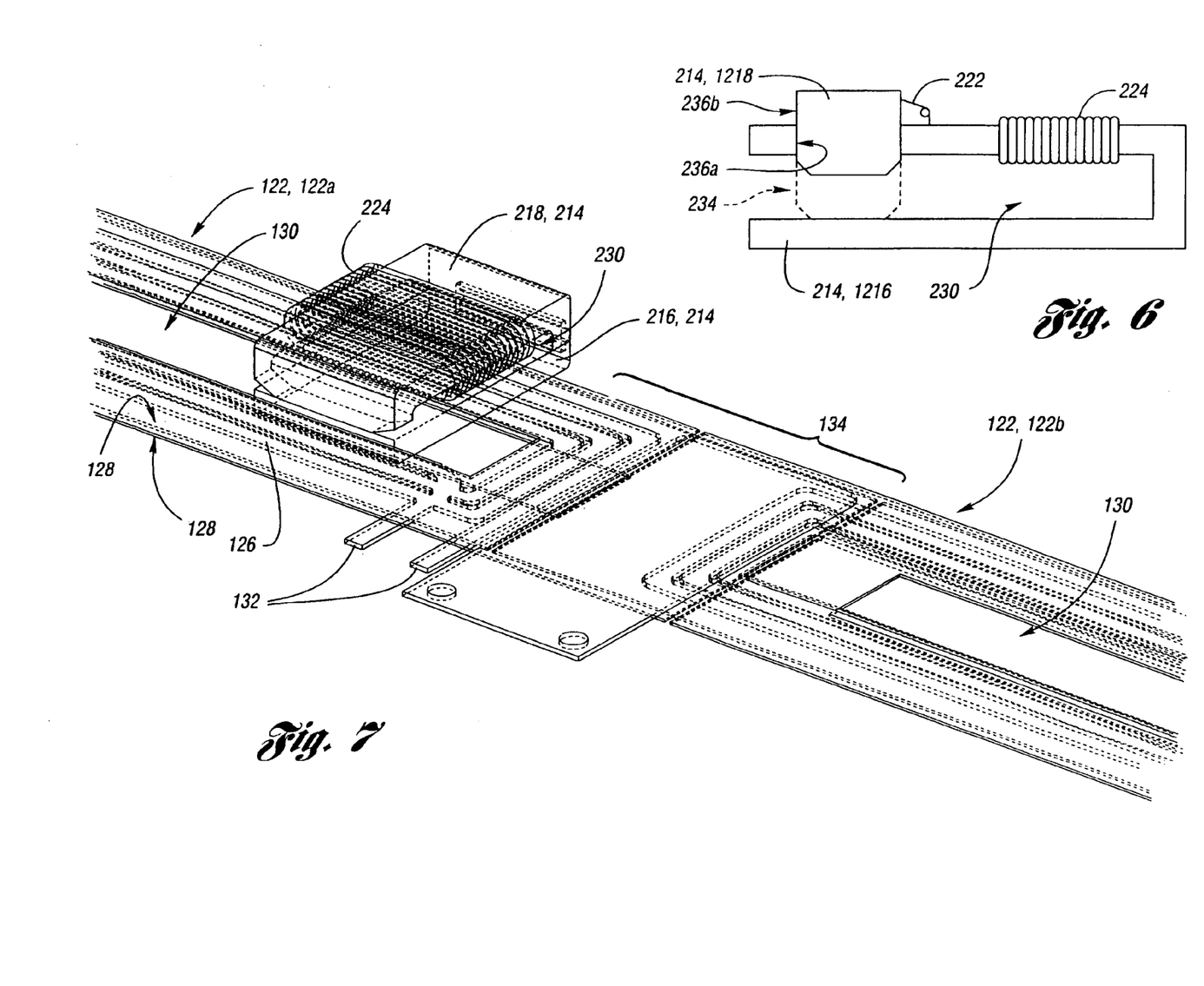
FIG. 6 is a side view of an alternative magnetic core.
FIG. 7 is a perspective view of the magnetic core installed on a primary coil.

FIG. 6 is a side view of an alternative embodiment of the magnetic core 214. In this embodiment, the second core member 1218 slides relative to the first core member 1216 instead of rotating about the hinge 220. Complementary guide surface 236a and 236b are provided on the first core member 1216 and second core member 1218 respectively to couple to two halves together and control the sliding. As shown in the figure, the second core member 1218 is in a separated position creating the gap 234. When the second core member 1218 is in a contact position (shown in phantom), then the gap 234 is closed and a closed magnetic path is formed around the magnetic core 214. Finally, resilient member 222 may be connected between the second core member 1218 and the first core member 1216 to bias the two core members 1216 and 1218 together.

An alternative embodiment of the primary coil 122 is shown in FIG. 7. In this alternative embodiment, each primary coil 122 has a planar coil 126 (shown in phantom) disposed between two insulating substrates 128. An opening 130 is provided in the substrates 128 to allow the first core member 216 and second core member 218 to contact each other and form the closed magnetic path. A pair of contacts protruding out from the substrates 128 are provided at each end of the planar coil 126. The planar coil 128 receives an alternating current through these contacts 132 from the power supply 124.

Automated library systems 100 can have one or more primary coils 122. Typically, one primary coil 122 is mounted adjacent to each individual section of rail 106. Where there are joints or breaks in the rails 106, such as at the elevators 108 shown in FIG. 1, then one primary coil 122 usually ends and the next primary coil 122 begins. FIG. 7 shows an example where two primary coils 122a and 122b meet. The primary coils 122a and 122b are positioned in the same plane so that the aperture 230 in the magnetic core 214 only has to accommodate one primary coil 122 at a time. Consequently, a powerless region 134 is created around the location where the two primary coils 122a and 122b meet.

Powerless region 134 poses two obstacles to a magnetic core 214 traversing between primary coils 122a and 122b. First, electrical power is not efficiently coupled from either primary coil 122a or 122b to the secondary coil 224 while the magnetic core 214 is in this powerless region 134. The robot 200 must either have sufficient momentum to glide across the powerless region 134 without electrical power, or a second source of electrical power, such as the onboard battery 226 must be available to operate the drive mechanism 210.

The second obstacle created by the powerless region 134 is a physical obstruction to the magnetic core 214. Opening 130 in the substrates 128 does not extend through the powerless region 134, thus the magnetic core 214 cannot maintain a closed loop when in the powerless region 134. As the magnetic core 214 reaches the powerless region 134, the beveled edges 232 of the second core member 218 engage the substrates 128 forcing the second core member 218 to separate from the first core member 216 and opening the gap 234. Once the magnetic core 214 leaves the powerless region 134, gravity or the resilient member 222 biases the second core member 218 and first core member 216 back together to close the gap 234.

Figure 8:
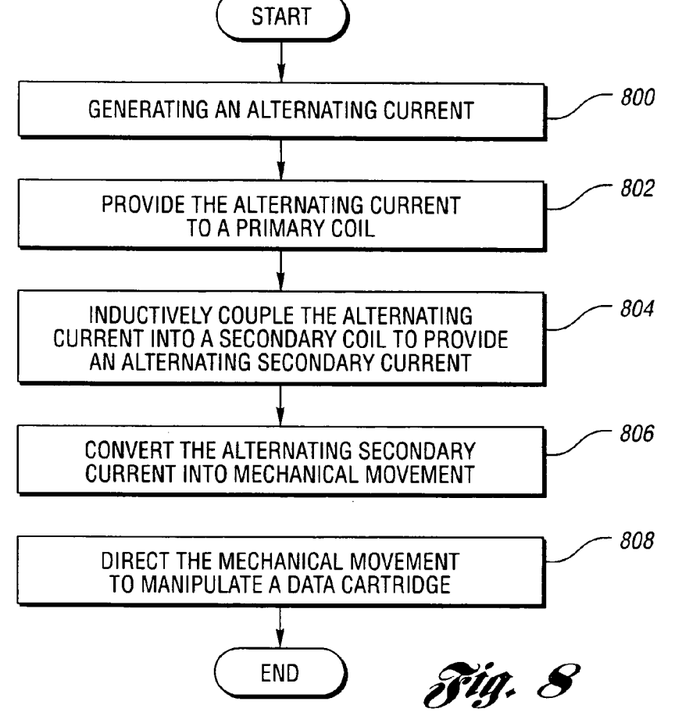
FIG. 8 is a flow diagram of a method of operating the automated library system.

FIG. 8 is a flow diagram of a method of operating the automated library system 100 to manipulate a data cartridge 90. The method starts with the generation of an alternating current by the power supply 124, as shown in block 800. The alternating current is then provided to a primary coil 122, as shown in block 802. A secondary coil 224 adjacent to the primary coil 122 inductively couples the alternating current in the primary coil 122 into a secondary alternating current in the secondary coil 224, as shown in block 804. Secondary alternating current is then converted into mechanical movement, as shown in block 806. This conversion may be performed by, but is not limited to the drive mechanism 210 and the gripper mechanism 228. Mechanical movement is then directed to manipulate at least one data cartridge 90 at a time, as shown in block 808. When the conversion of the secondary alternating current into mechanical movement is performed by the drive mechanism 228, the manipulation of the data cartridge 90 is moving the data cartridge 90 along the rails 106. When the conversion of the secondary alternating current into mechanical movement is performed by the gripper mechanism 228, the manipulation of the data cartridge 90 is loading and unloading of that data cartridge to and from the robot 200. Other types of data cartridge 90 manipulations are possible within the scope of the present invention.

Figure 9:
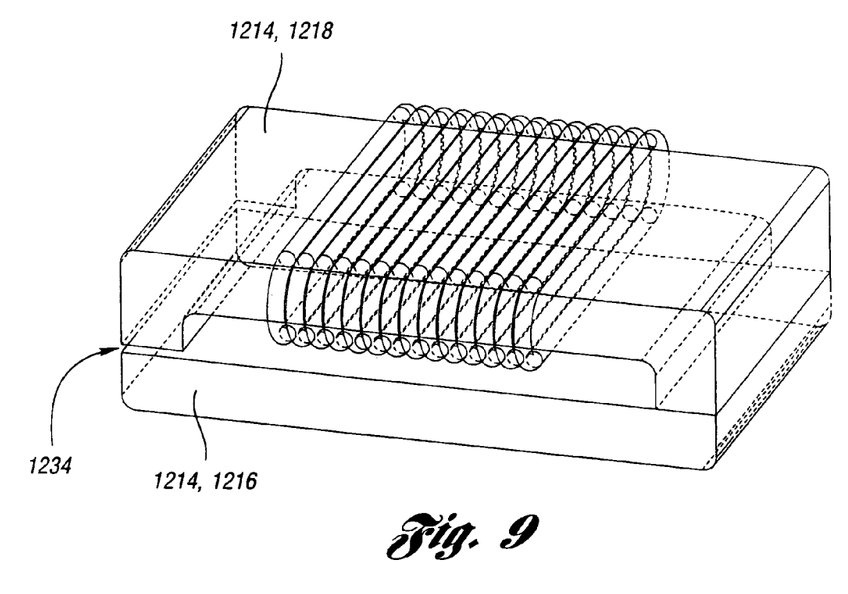
FIG. 9 is a wire frame view of a gapped magnetic core.
Figure 10:
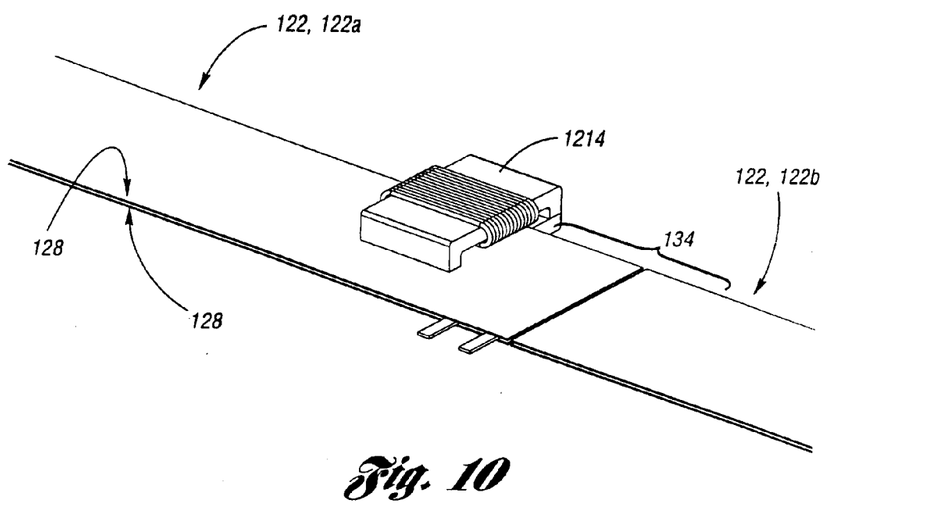
FIG. 10 is perspective view of the gapped magnetic core installed on a primary coil.

An alternative embodiment of magnetic core 1214 is shown in FIG. 9. In this embodiment, the second core member 1218 is rigidly fixed to the first core member 1216 at one end. A permanent gap 1234 between the first core member 1216 and second core member 1218 is provided at the other end. The permanent gap 1234 is sufficiently large to accommodate the substrates 128 of the primary coils 122a and 122b, as shown in FIG. 10. As a result, the opening 130 is not required in the substrates 128, and the powerless region 134 does not create a physical obstruction to this magnetic core 1214.

Figure 11:
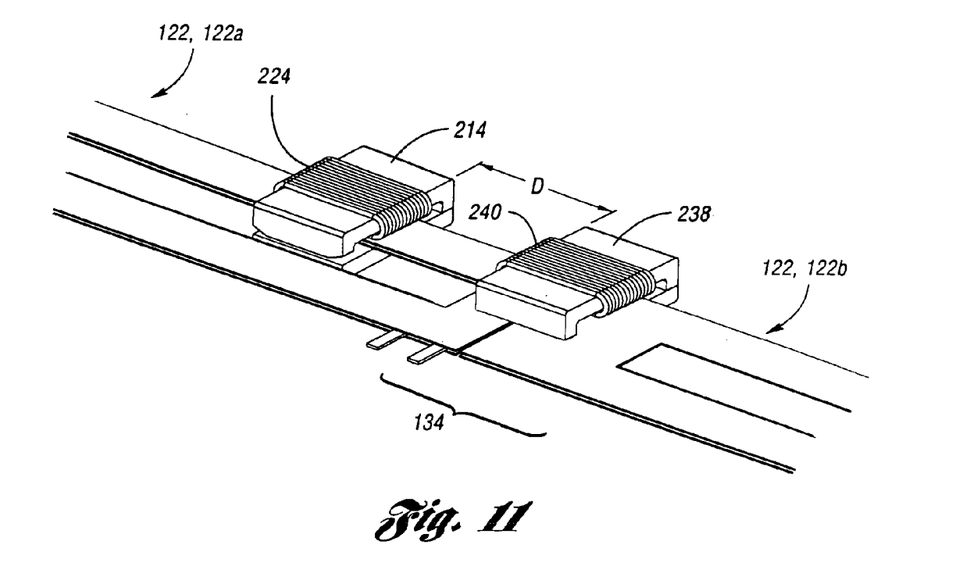
FIG. 11 is a perspective view of two magnetic cores traversing between adjacent primary coils.

Referring to FIG. 11, the inability to inductively couple electrical power from either primary coil 122a or 122b while the magnetic core 214 is in the powerless region 134 can be overcome by adding a second magnetic core 238 and a second secondary coil 240 to the robot 200. The (first) magnetic core 214 and second magnetic core 238 are spaced apart from each other by a distance D that is at least as long as the powerless region 134. While the second magnetic core 238 is traversing the power less region 134, the (first) magnetic core 214 is still drawing electrical power from primary coil 122a. Before the (first) magnetic core 214 enters the powerless region 134, the second magnetic core 238 exits the powerless region 134 and begins drawing electrical power from the adjacent primary coil 122b. Separation of the two magnetic cores 214 and 238 allow the robot 200 to receive electrical power from at least one of the primary coils 122a and 122b at all times while the robot 200 is traversing between the primary coils 122a and 122b. While both magnetic cores 214 and 238 are on the same primary coil 122, then both are inductively coupled to, and draw electrical power from that same primary coil 122.

Figure 12:
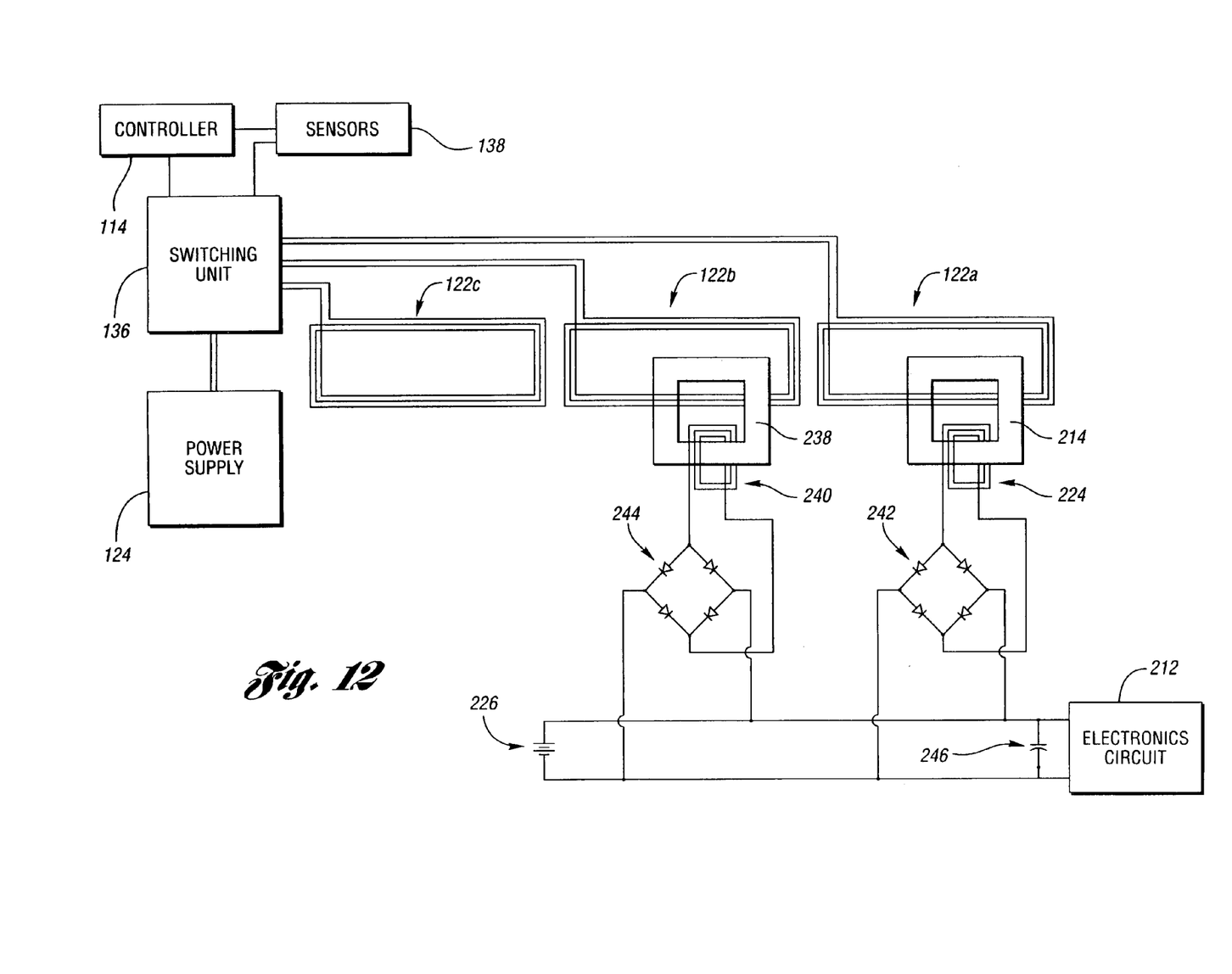
FIG. 12 is a schematic of the electrical power components.

Electrically, the second alternating currents induced in both secondary coils 224 and 240 can be added by connecting both secondary coils 224 and 240 together. This configuration, however, requires that all of the alternating currents applied to the primary coils 122 are in phase with each other. If not, the secondary alternating current induced in the secondary coil 224 may add destructively with a second secondary alternating current induced in the second secondary coil 240. In the preferred embodiment, each secondary alternating current is rectified individually before being combined, as shown in FIG. 12. The secondary coil 224 is connected to a first full wave bridge rectifier 242. The second secondary coil 240 is connected to a second full wave bridge rectifier 244. Other types of rectifiers may also be used within the scope of the present invention. The outputs of each full wave bridge rectifier 242 and 244 are connected together and filtered by a capacitor 246 or other type of filter. If a battery 226 is included in the robot 200, it is also connected to the output of the full wave bridge rectifiers 242 and 244 at this point. Finally, the resulting direct current electrical power is provided to the electronics circuit 212 and any other load in the robot 200 requiring electrical power.

Robots 200 only draw electrical power from the primary coils 122 to which they are adjacent and inductively coupled. In the example shown in FIG. 12, electrical power is only drawn from primary coils 122a and 122b. Primary coil 122c is not adjacent to either magnetic coil 214 or 238 and thus does not inductively couple electrical power into secondary coils 224 or 240. To avoid any unnecessary power losses, the alternating current in primary coil 122c may be switched off while no robots 200 are nearby. Switching of the alternating current to the primary coils 122a–c may be accomplished by providing each primary coil 122a–c with an independent power supply (not shown). In the preferred embodiment, a switching unit 136 is connected between the power supply 124 and the primary coils 122a–c. Switching unit 136 is operative to individually switch the alternating current generated by the power supply 124 to each of the primary coils 122a–c.

Knowledge of when to switch on and switch off the alternating current to the various primary coils 122 may be provided by the controller 114. The controller 114 knows the location of each robot 200 within the automated library system 100 and thus which primary coil or coils 122 each robot 200 is adjacent to, is approaching, and has departed. The controller 114 may use this knowledge to issue commands to the switching unit 136 that ensure that all active robots 200 are receiving electrical power. Likewise, the controller 114 may issue commands to the switching unit 136 to switch off the alternating current to all primary coils 122 that are not near at least one robot 200.

Figure 13:
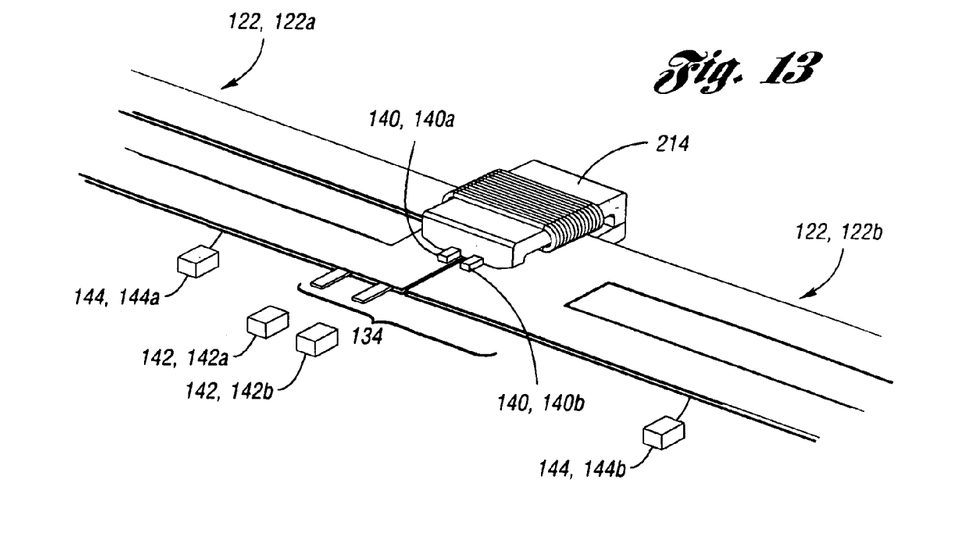
FIG. 13 is a perspective view of sensors associated with the primary coils.

Sensors 138 may also be used to generate a signal informing when at least one robot 200 is near or adjacent to an associated primary coil 122. The sensors 138 may be connected to the switching unit 138 directly, indirectly through the controller 114, or both. Referring to FIG. 13, the sensors 138 may be any combination of contact sensors 140, proximity sensors 142, inductance sensors 144, or the like that can determine when a robot is present and/or nearby.

If the sensor 138 employed are a contact sensors 140, then at least one contact sensor 140 is required for each primary coil 122. A single contact sensor 140 may parallel its associated primary coil 122 to make contact with any robot 200 operating along the associated primary coil 122. As long as at least one robot 200 is engaging this contact sensor 140 then the alternating current is switched on for the associated primary coil 122. When no robots 200 engage the contact sensor 140, then the alternating current for the associated primary coil 122 is switched off.

In another embodiment, two contact sensors 140 are associated with each primary coil 122, as shown in FIG. 13. Each of the two contact sensors 140 is positioned in one of the powerless regions 134 at each end of the associated primary coil 122. When a robot 200 is sensed by the first contact sensor 140a and then the second contact sensor 140b, then the alternating current is switched on for the second primary coil 122b. If multiple robots 200 are allowed on the primary coil 122b simultaneously, then a count must be kept of how may robots moved onto primary coil 122b. When the last robot 200 on the first primary coil 122a is sensed by the first contact sensor 140a and then the second contact sensor 140b, then the alternating current to the first primary coil 122a may be switched off.

Proximity sensors 142 may also be used to detect when robots 200 arrive and depart from associated primary coils 122. By mounting pairs of proximity sensors 142 in each powerless region 134, it can be determined when and in which direction in which a robot 200 is moving between the first primary coil 122a and the second primary coil 122b.

In still another embodiment, inductance sensors 144 may be coupled to each primary coil 122, with one inductance sensor 144 being coupled to each primary coil 122 respectively. Each inductance sensor 144 senses the presence or absence of the inductive load created by the secondary coils 224 and 240 of the robots 200. When one or more inductive loads are sensed on a primary coil 122 by the associated inductance sensor 144, then the alternating current is switched on for that primary coil 122. When no inductive loads are sensed on the associated primary coil 122, then the alternating current is switched off for that associated primary coil 122.

Figure 14:
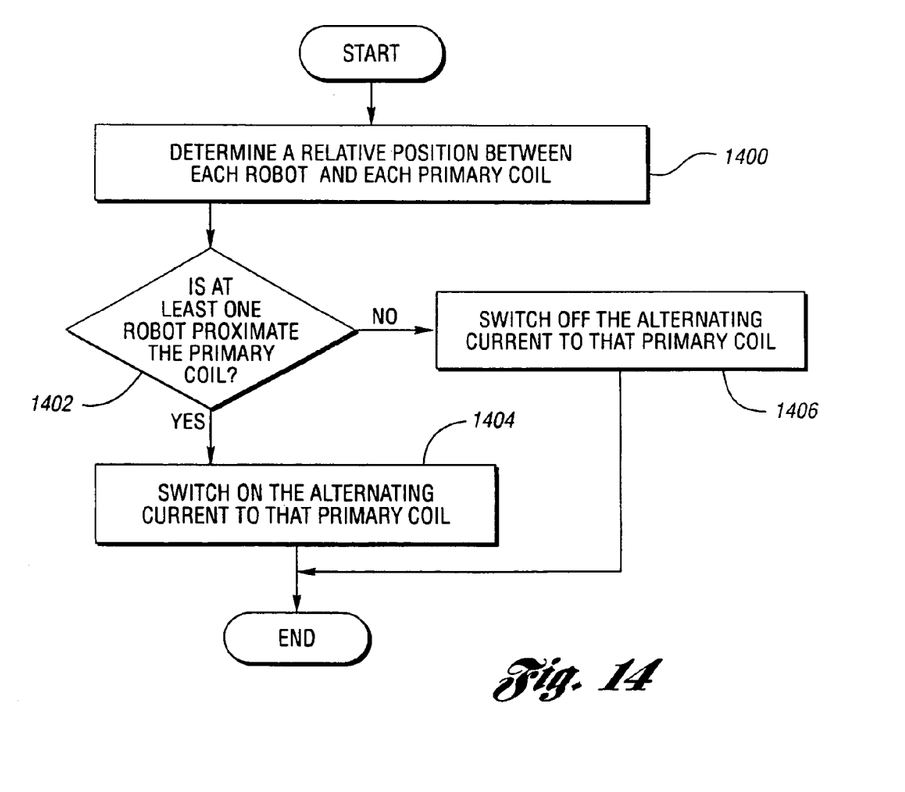
FIG. 14 is a flow diagram of a method for switching on and off an alternating current to individual primary coils.

FIG. 14 is a flow diagram of a method of operation for switching on and off the alternating current to multiple primary coils 122. First, the relative position between each robot 200 and each primary coil 122 is determined, as shown in block 1400. This may be accomplished by any sensor 138 that can determine if one or more robots 200 are adjacent to the associated primary coil 122 or not. Alternatively, this function may be performed by the controller 114 by comparing the commanded position it provided to each robot 200 with the primary coils 122 at and near those commanded positions.

For each primary coil 122, if at least one robot 200 is found to have a relative position proximate that primary coil, the YES branch of decision block 1402, then the alternating current is switched on for that primary coil 122, as shown in block 1404. If no robots 200 are found to have relative positions proximate any given primary coil 122, the NO branch of decision block 1402, then the alternating current for that primary coil 122 is switched off, as shown in block 1406.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An automated library system having a plurality of data cartridges, the system comprising:

a plurality of storage cells to store the plurality of data cartridges;

at least one rail disposed adjacent to the plurality of storage cells;

at least one primary coil disposed proximate to the at least one rail;

a power supply connected to the at least one primary coil to produce an alternating current in the at least one primary coil;

at least one robot disposed on the at least one rail, the at least one robot being operative to insert and remove the plurality of data cartridges at least one at a time from the plurality of storage cells; and a secondary coil disposed on each of the at least one robots respectively and positioned to inductively couple at least a portion of the alternating current in the at least one primary coil to the at least one robot; wherein, the at least one robot comprises a drive mechanism powered through the secondary coil and coupled to drive wheels that ride in the at least one rail and rotate to move the robot about within the automated library system.

2. The automated library system of claim 1 wherein the at least one primary coil is a plurality of primary coils.

3. The automated library system of claim 2 further comprising a second secondary coil disposed on each of the at least one robot respectively and positioned to inductively couple at least a portion of the alternating current in at least one of the plurality of primary coils to the at least one robot.

4. The automated library system of claim 3 wherein a powerless region exists between adjacent ones of the plurality of primary coils, and wherein the secondary coil and the second secondary coil on each of the at least one robot are spaced apart from each other at least as far as the powerless region to maintain inductive coupling to at least one of the plurality of primary coils.

5. The automated library system of claim 2 further comprising a battery disposed on each of the at least one robots respectively to supply electrical power to the at least one robot.

6. The automated library system of claim 2 further comprising a switching unit coupled between the power source and the plurality of primary coils, the switch unit being operative to individually switch on and off the alternating current to each of the plurality of primary coils.

7. The automated library system of claim 2 further comprising a plurality of sensors in communication with the switching unit, the plurality of sensors being disposed proximate the plurality of primary coils, at least one sensor of the plurality of sensors being associated with each of the plurality of primary coils respectively to generate a signal informing the switching unit when the at least one robot is proximate the respective primary coil.

8. The automated library system of claim 6 further comprising a plurality of inductance sensors in communication with the switching unit and coupled to the plurality of primary coils, one inductance sensor of the plurality of sensors being coupled to a respective one of the plurality of coils to generate a signal informing the switching unit when the at least one secondary coil is inductively coupled to the respective primary coil.

9. The automated library system of claim 6 further comprising a controller in communication with the at least one robot and the switching unit, the controller being operative to generate commands directing movement of the at least one robot among the plurality of primary coils and to command the switching unit when to switch on and off the alternating current to individual primary coils to manage distribution of the alternative current to the plurality of primary coils.

10. A robot for use in an automated library system having a controller and at least one primary coil carrying an alternating current, the robot comprising:
 a frame;
 a drive mechanism attached to the frame and coupled to drive wheels that ride in at least one rail in the automated library system and rotate to move the robot about within automated library system;
 an electronics circuit disposed on the frame and in communication with the drive mechanism and the automated library system to facilitate control of the drive mechanism in accordance with commands from the controller;
 a magnetic core disposed on the frame, the magnetic core having a first core member disposed on one side of the at least one primary coil and a second core member disposed on the opposite side of the at least one primary coil, wherein the second core member engages the first core member to form a closed magnetic path and the second core member moves relative to the first core member to form a gap that allows insertion and removal of the magnetic core from the at least one primary coil;
 a secondary coil wound around the magnetic core and electrically connected to the electronics circuit, the secondary coil inductively coupling at least a portion of the alternating current from the at least one primary coil to the electronics circuit.

11. The robot of claim 10 wherein the coupling is a set of complementary guide surfaces provided in the first core member and the second core member that enable the second core member to slide relative to the first core member.

12. The robot of claim 11 further comprising a resilient member disposed between the first core member and the second core member to bias the first core member and the second core member towards each other.

13. The robot of claim 10 wherein the coupling comprises a hinge attached between the first core member and the second core member.

14. The robot of claim 13 further comprising a resilient member disposed between the first core member and the second core member to bias the first core member and the second core member towards each other.

15. The robot of claim 10 further comprising:
 a second magnetic core disposed on the frame, the second magnetic core having a third core member and a fourth core member;
 a second magnetic core disposed on the frame, the magnetic core having a third core member disposed on one side of the at least one primary coil and a fourth core member disposed on the opposite side of the at least one primary coil, wherein the fourth core member engages the third core member to form a closed magnetic path and the fourth core member moves relative to the third core member to form a gap that allows insertion and removal of the second magnetic core from the at least one primary coil;
 a second secondary coil wound around the second magnetic core and electrically connected to the electronics circuit, the second secondary coil inductively coupling at least a portion of the alternating current from the at least one primary coil to the electronics circuit.

16. The robot of claim 10 further comprising a battery disposed on the frame and electrically connected to the electronics circuit to supply electrical power to the electronics circuit.

17. A method of operating an automated library system having a plurality of data cartridges, wherein the automated library system has at least one robot operative to move adjacent to at least one primary coil, the method comprising;
 providing an alternating current in the at least one primary coil;
 inductively coupling at least a portion of the alternating current in the at least one primary coil into the at least one robot to produce a secondary alternating current;
 converting the secondary alternating current into a mechanical movement of the at least one robot; and
 directing the mechanical movement of the at least one robot to manipulate the plurality of data cartridges at least one at a time and to move the robot about within the automated library system, using a drive mechanism on the robot, wherein the drive mechanism is coupled to drive wheels that ride in at least one rail in the automated library system and rotate to provide the movement of the robot.

18. The method of claim 17 wherein the at least one primary coil is a plurality of primary coils, and the step of providing the alternating current in the plurality of primary coils comprises:
   determining a relative position between the at least one robot and each of the plurality of primary coils;
   applying the alternating current to each of the plurality of primary coils proximate the at least one robot; and
   removing the alternating current from each of the plurality of primary coils distant from all of the at least one robot.

19. The method of claim 17 wherein the at least one primary coil is a plurality of primary coils, and the step of inductively coupling the alternating current comprises:
   inductively coupling at least a portion of the alternating current in a first primary coil of the plurality of coils into the at least one robot to produce a first secondary alternating current; and
   inductively coupling at least a second portion of the alternating current in a second primary coil of the plurality of coils into the at least one robot to produce a second secondary alternating current.

20. The method of claim 19 wherein the step of converting the secondary alternating current into the mechanical movement comprises:
   rectifying the first secondary alternating current to produce a direct current in response to producing the first secondary alternating current;
   rectifying the second secondary alternating current to produce the direct current in response to producing the second secondary alternating current; and
   converting the direct current into the mechanical movement to manipulate the plurality of data cartridges in response to producing the direct current.

21. The method of claim 17 further comprising:
   providing a battery on each of the at least one robots to provide a direct current; and
   wherein the step of converting the secondary alternating current into the mechanical movement comprises:
   rectifying the secondary alternating current to produce the direct current; and
   converting the direct current into the mechanical movement to manipulate the plurality of data cartridges and move the robot.

* * * * *